US008660498B2

(12) United States Patent
Gurney et al.

(10) Patent No.: US 8,660,498 B2
(45) Date of Patent: Feb. 25, 2014

(54) METHOD FOR DATABASE DRIVEN CHANNEL QUALITY ESTIMATION IN A COGNITIVE RADIO NETWORK

(75) Inventors: David P. Gurney, Carpentersville, IL (US); Stephen L. Kuffner, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 948 days.

(21) Appl. No.: 12/493,886

(22) Filed: Jun. 29, 2009

(65) Prior Publication Data

US 2010/0330919 A1 Dec. 30, 2010

(51) Int. Cl.
*H04B 17/00* (2006.01)

(52) U.S. Cl.
USPC ........................................ 455/67.11

(58) Field of Classification Search
USPC ................. 455/522, 67.11, 63.1, 62
See application file for complete search history.

(56) References Cited

U.S. PATENT DOCUMENTS

| 5,497,503 | A | * | 3/1996 | Rydberg et al. ............... 455/454 |
| 5,677,909 | A | | 10/1997 | Heide |
| 5,940,768 | A | * | 8/1999 | Thro et al. .................... 455/507 |
| 6,377,567 | B1 | | 4/2002 | Leonard |
| 6,442,387 | B1 | * | 8/2002 | Silventoinen et al. ........ 455/436 |
| 6,519,568 | B1 | | 2/2003 | Harvey et al. |
| 6,996,374 | B1 | | 2/2006 | Bao |
| 7,127,212 | B2 | | 10/2006 | Fattouch |
| 7,366,519 | B2 | | 4/2008 | Jason |
| 2005/0159109 | A1 | | 7/2005 | Kivekas et al. |
| 2006/0067354 | A1 | * | 3/2006 | Waltho et al. ................ 370/433 |
| 2006/0084444 | A1 | | 4/2006 | Kossi et al. |
| 2006/0135070 | A1 | * | 6/2006 | Karabinis ..................... 455/63.1 |
| 2006/0227747 | A1 | | 10/2006 | Kim et al. |
| 2006/0268738 | A1 | | 11/2006 | Goerke et al. |
| 2007/0032254 | A1 | | 2/2007 | Chen |
| 2007/0091998 | A1 | | 4/2007 | Woo et al. |
| 2007/0097904 | A1 | | 5/2007 | Mukherjee et al. |

(Continued)

FOREIGN PATENT DOCUMENTS

| WO | WO0108322 A1 | 2/2001 |
| WO | 2009018300 A1 | 2/2009 |

OTHER PUBLICATIONS

FCC ET Docket No. 04-186, "Unlicensed Operation in the TV Broadcast Bands—Notice of Proposed Rule Making", May 25, 2004.

(Continued)

*Primary Examiner* — Nay A Maung
*Assistant Examiner* — Erica Fleming-Hall
(74) *Attorney, Agent, or Firm* — Barbara R. Doutre

(57) ABSTRACT

A method of determining operating parameters for a secondary system transmitter is described. The transmitter characteristics, including location and operating frequency band, are provided to a geo-location database. The database determines the maximum allowable transmission power that meets various specifications for different channels and conveys the power and channel(s) to the transmitter. The database estimates channel incumbent signal strengths based on the transmitter location and primary and higher-priority secondary incumbent systems, estimates the splatter levels, determines whether adjacent and co-channel interference protection ratios are met, and adjusts the allowable power level accordingly. The database also estimates aggregate co- and adjacent channel primary and secondary incumbent system interference levels at the transmitter location and predicts channel quality for each allowable channel. The estimated levels are updated using measurements of actual levels at the transmitter location. The database dynamically allocates channels using the secondary system priorities.

24 Claims, 7 Drawing Sheets

(56) References Cited

U.S. PATENT DOCUMENTS

| | | | |
|---|---|---|---|
| 2008/0076450 | A1 | 3/2008 | Nanda et al. |
| 2008/0089306 | A1 | 4/2008 | Hu |
| 2008/0171552 | A1 | 7/2008 | Hyon et al. |
| 2008/0216133 | A1* | 9/2008 | Vergoossen ............... 725/86 |
| 2008/0222020 | A1 | 9/2008 | Stanforth et al. |
| 2008/0222021 | A1 | 9/2008 | Stanforth et al. |
| 2008/0261639 | A1 | 10/2008 | Sun et al. |
| 2008/0299918 | A1 | 12/2008 | Jallon |
| 2009/0003201 | A1* | 1/2009 | Horvitz ..................... 370/229 |
| 2009/0011788 | A1* | 1/2009 | Shan et al. ................ 455/522 |
| 2009/0012738 | A1* | 1/2009 | Hart et al. ................. 702/127 |
| 2009/0111463 | A1 | 4/2009 | Simms et al. |
| 2009/0186632 | A1* | 7/2009 | Kennedy et al. .......... 455/456.5 |
| 2009/0191910 | A1* | 7/2009 | Athalye et al. ............ 455/522 |
| 2009/0215457 | A1 | 8/2009 | Wang et al. |
| 2009/0245119 | A1 | 10/2009 | Kuffner et al. |
| 2009/0268619 | A1 | 10/2009 | Dain et al. |
| 2009/0270025 | A1* | 10/2009 | Kossi et al. ............... 455/3.01 |
| 2010/0041339 | A1* | 2/2010 | Miller, II .................. 455/62 |
| 2010/0046440 | A1* | 2/2010 | Singh ........................ 370/329 |
| 2010/0075704 | A1* | 3/2010 | McHenry et al. ......... 455/509 |
| 2010/0098036 | A1* | 4/2010 | Li .............................. 370/338 |
| 2010/0195590 | A1* | 8/2010 | Park .......................... 370/329 |
| 2010/0255794 | A1* | 10/2010 | Agnew ...................... 455/77 |
| 2010/0304678 | A1* | 12/2010 | Chandra et al. ........... 455/62 |
| 2010/0309317 | A1* | 12/2010 | Wu et al. .................. 348/180 |
| 2011/0170512 | A1* | 7/2011 | Ghosh et al. .............. 370/329 |
| 2011/0312368 | A1 | 12/2011 | Hamdi et al. |
| 2012/0135767 | A1* | 5/2012 | Singh ........................ 455/509 |

OTHER PUBLICATIONS

WiFi Alliance 04-186 Unlicensed Device Operation in the TV Bands petition for reconsideration, filed with FCC Mar. 19, 2009.

Visotsky, E. et al., "On Collaborative Detection of TV Transmissions in Support of Dynamic Spectrum Sharing," First IEEE International Symposium on New Frontiers in Dynamic Spectrum Access Networks, DySPAN, pp. 338-345, 2005.

Grecu, M and Krajewski, W. F., "Detection of Anomalous Propagation Echoes in Weather Radar Data Using Neural Networks," IEEE Transactions on Geoscience and Remote Sensing, vol. 37, No. 1, pp. 287-296, Jan. 1999.

Gruenwald, L. and Banik, S., "A Power-Aware Technique to Manage Real-Time Database Transactions in Mobile Ad-Hoc Networks," Proceedings of the 12th Annual Workshop on Database and Expert Systems Applications, Sep. 2001.

International Search Report and Written Opinion for International Patent Application No. PCT/US2009/036892 mailed on Jul. 1, 2009.

Nolan, K. E. et al., "Demon strati on and Analyses of Collaboration, Coexistence, and Interoperability of Cognitive Radio Platforms" Consumer Communications and Networking Conference, 2007. CCNC 2007. 20 07 4th IEEE, IEEE, PI, Jan. 1, 2007.

Zhang, K. et al., "Dynamic Spectrum Access Enabled DoD Netcentric Spectrum Management" military communications conference, 2007. Milcom 2007. IEEE, IEEE, Piscataway, NJ, USA, Oct. 29, 2007, pp. 1-7, XP031232459.

Zhao, Y. et al., "Applying Radio Environment Maps to Cognitive Wireless Regional Area Networks" New Frontiers in Dynamic Spectrum Access Networks, 2007, Dyspan 2007. 2nd IEEE International Symposium on, IEEE, PI, Apr. 1, 2007, pp. 115-118, XP031095609.

Jondral, F. K., "Cognitive Radio: A Communications Engineering View" IEEE Wireless Communications, IEEE Service Center, Piscataway, NJ, US, vol. 14, No. 4, Aug. 1, 2007, pp. 28-33, XP011191775.

International Preliminary Report on Patentability and Written Opinion for related International Patent Application No. PCT/US2009/036892 issued on Oct. 5, 2010.

Chang-Joo Kim et al—"WRAN PHYand MAC Proposal forTDD/FDD"—IEEE 802.22-05/018r0—Wireless RANs—Nov. 2005—42pp.

Non Final Office Action mailed on Jan. 25, 2010 in U.S. Appl. No. 12/059,851, Stephen L. Kuffner, filed Mar. 31, 2008.

Final Office Action mailed on Jul. 12, 2010 in U.S. Appl. No. 12/059,851, Stephen L. Kuffner, filed Mar. 31, 2008.

Non Final Office Action mailed on Mar. 4, 2011 in U.S. Appl. No. 12/059,851, Stephen L. Kuffner, filed Mar. 31, 2008.

Final Office Action mailed on Aug. 11, 2011 in U.S. Appl. No. 12/059,851, Stephen L. Kuffner, filed Mar. 31, 2008.

Non Final Office Action mailed on Jul. 13, 2012 in U.S. Appl. No. 12/059,851, Stephen L. Kuffner, filed Mar. 31, 2008.

Non Final Office Action mailed on Feb. 5, 2013 in related U.S. Appl. No. 12/059,851, Stephen L Kuffner, filed Mar. 31, 2008.

Notice of Allowance mailed on Jul. 31, 2013 in related U.S. Appl. No. 12/059,851, Stephen L Kuffner, filed Mar. 31, 2008.

Office Action for related Canadian Patent Application No. 2719498 mailed on Oct. 15, 2012.

Office Action for related Canadian Patent Application No. 2719498 mailed on May 27, 2013.

International Search Report and Written Opinion for counterpart International Patent Application No. PCT/US2010/039399 mailed on Feb. 10, 2012.

IEEE Standard for Local and Metropolitan Area Networks, "Part 11: Wireless LAN Medium Access Control(MAC) and Physical Layer(PHY) Specifications: High-speed Physical Layer in the 5 GHZ Band," IEEE Std 802.11a-1999, 90 pages.

IEEE Standard for Local and Metropolitan Area Networks, "Part 16 : Air Interface for Fixed Broadband Wireless Access Systems," IEEE Std. 802.16-2004, pp. i-445.

IEEE Standard for Local and Metropolitan Area Networks, "Part 16 : Air Interface for Fixed Broadband Wireless Access Systems," IEEE Std. 802.16-2004, pp. 445-893.

* cited by examiner

METHOD FOR DATABASE DRIVEN CHANNEL QUALITY ESTIMATION IN A COGNITIVE RADIO NETWORK

RELATED APPLICATION

The present invention is related to U.S. application Ser. No. 12/059,851, filed Mar. 31, 2008, entitled "COMMUNICATION SYSTEM FOR EXCHANGING SPECTRUM SENSING MEASUREMENTS THROUGH A DROP BOX AND METHOD OF USING SAME" herein incorporated by reference in its entirety.

TECHNICAL FIELD

The present invention relates generally to communication systems and more particularly to channel selection in a cognitive radio network using a database to enable spectrum sharing and to avoid or limit interference with incumbent communication systems.

BACKGROUND

In wireless communications, different frequency bands are set aside by the Federal Communications Commission (FCC) for different purposes. Users of a particular frequency band may be primary or secondary, licensed or unlicensed users. Existing users of a particular frequency spectrum are called incumbents of that spectrum. A Cognitive Radio (CR) is typically an unlicensed secondary device that relies on dynamic spectrum access techniques to gain access to spectrum that is used by incumbents (e.g., primary licensed services). Such techniques typically require accessing a geo-location database (also referred to merely as a database) to determine available channels in the geographical area.

Incumbent transmitter parameter databases, which are often maintained by regulatory agencies such as the FCC, typically contain information about the transmission characteristics of each incumbent system and device. These characteristics include, for example, transmitter location, effective radiated power (ERP), antenna patterns, and antenna height above average terrain (HAAT), in a variety of frequency bands. One example of such a transmitter parameter database is the FCC's Consolidated Data Base System (CDBS). While these databases contain information including both signal characteristics and physical location of the incumbents, they do not contain information about secondary systems that operate opportunistically in the band (such as cognitive radios).

It is thus desirable to provide dynamic information regarding the quality and usage of available channels using detailed information about not only primary, but also secondary transmitters operating in a desired frequency band. In this manner, opportunistic secondary systems can achieve higher quality of service (e.g., higher data throughput, longer range, fewer errors) on a near real-time basis.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
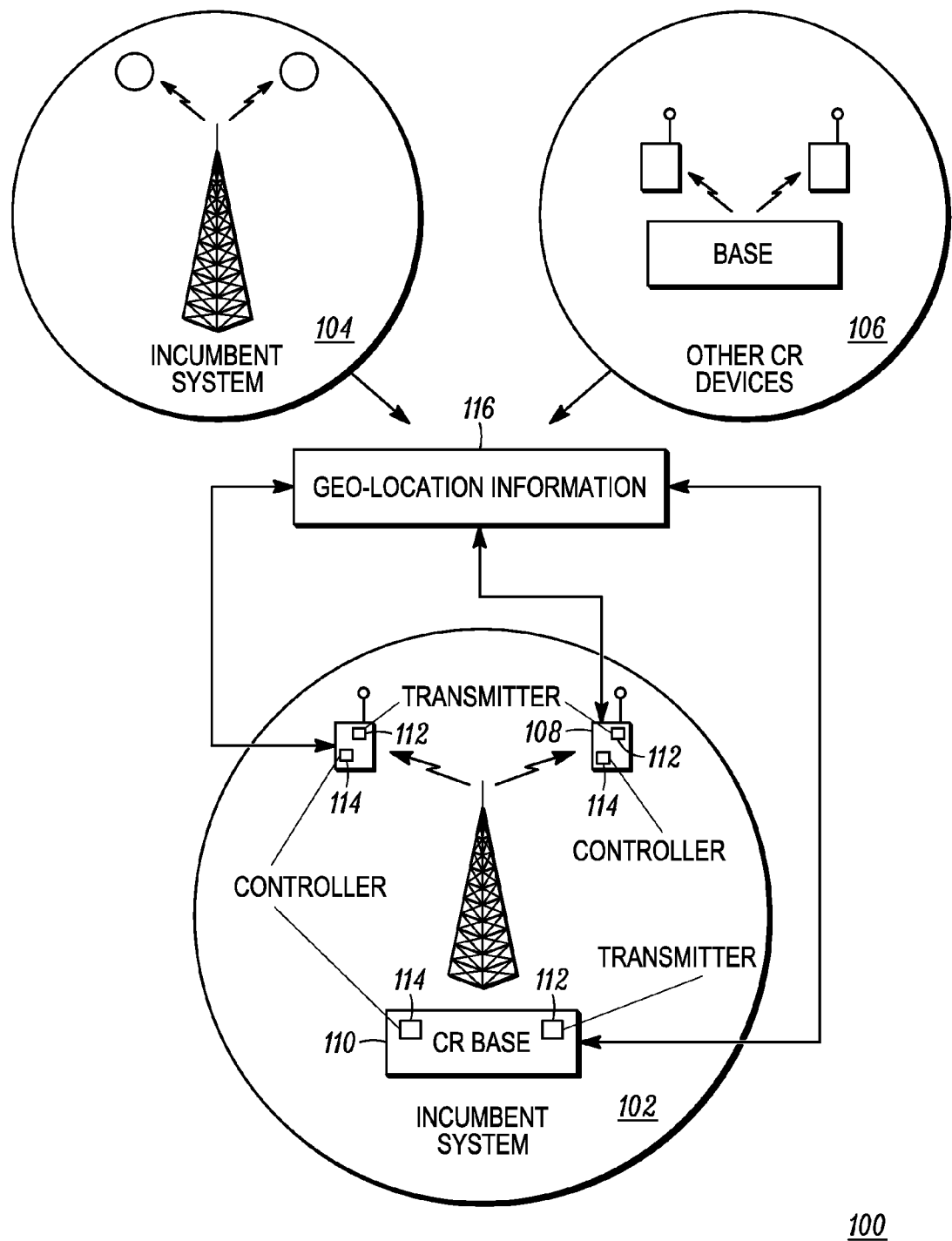
FIG. 1 illustrates a plurality of communication systems operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail the various embodiments of the invention defined by the claims, it should be observed that such embodiments reside primarily in combinations of method steps and apparatus components using a geo-location database containing incumbent and other secondary system information to adapt, modify or update operating parameters of a secondary system such as a cognitive radio system to protect the incumbent system.

One role of the geo-location database (also referred to herein merely as a database) is to protect incumbent systems from harmful interference from secondary systems. This is enabled as devices in the secondary system (secondary devices) access the database to determine open frequencies and other operating characteristics (e.g., maximum allowed transmit power level for the open frequency) for the frequency bands (also called spectrum) in which they operate. For example, for a secondary device to utilize TV white space (TVWS) in the United States, the FCC requires that the database be accessed based on the current operating location of the secondary device. Such access is currently only required to determine open channels, i.e., those channels offering full power operation. It would be desirable to fully employ the abilities of possible future versions of databases, such as those that may support variable transmit power secondary device operation based on proximity to other incumbents in the band.

Moreover, there are currently no requirements for a geo-location database to provide an estimation or prediction of the channel quality of the available (either open or partially open) communications channels. Nor do geo-location databases presently contain accurate information about the actual usage of the spectrum. Such information is desirable, especially in TV bands, which are likely to be of increasing demand due to their excellent propagation characteristics. Moreover, while the secondary devices operating in TV bands must register with the database to operate under the current FCC rules, as above such devices only currently receive open channel information from the database—they do not submit operational information such as antenna pattern and transmit frequency, power level, operational bandwidth, and timing to the database. If secondary devices are able to submit such operational information, it would be possible to perform more dynamic planning and coordination of secondary device usage of the spectrum.

To facilitate protection of the incumbent systems from harmful interference generated from opportunistic secondary systems, the database information is used to provide computational results that depend on the proximity of the secondary devices to the transmitters and receivers of those other systems. In one example, the maximum allowed transmission power for a secondary cognitive radio device is typically computed by first determining if the cognitive radio device is located within a protected service contour of a primary incumbent system. An incumbent's protected service contour is typically determined by the regulatory body (e.g., the FCC) for the region, though it may also be determined by other entities. Generally, the cognitive radio device is not allowed to transmit co-channel inside of a protected service contour to protect incumbent receivers inside the primary system's service contour. However, the cognitive radio device may transmit on an adjacent channel at a variable or reduced transmit power, depending on the proximity to a primary incumbent system(s). It was originally proposed that U.S. TVWS cognitive radio devices be allowed to transmit with power levels proportional to the estimated incumbent signal strength levels at a particular location when operating inside of an adjacent channel contour. If outside of the protected service contour however, a cognitive radio device may transmit with full power levels if it is a sufficient distance away from the nearest protected service contour edge (i.e., incumbent receiver), or alternatively they may transmit with variable power levels based on interference power constraints at the nearest incumbent receiver (determined by the distance to the nearest protected contour edge).

For the purposes of this application "system parameters" can include transmitter and receiver information (e.g., transmit power level, transmit frequency, operational bandwidth, transmit timing, etc.) and other system operation information. Adapting the secondary system operating parameters according to the primary and secondary system information contained in the geo-location database effectively increases the throughput or communications range of the secondary system. Accordingly, the apparatus components and method steps have been represented where appropriate by conventional symbols in the drawings, showing only those specific details that are pertinent to understanding the various embodiments so as not to obscure the disclosure with details that will be readily apparent to those of ordinary skill in the art having the benefit of the description herein.

As above, for the purposes of this application, the term "incumbent system" typically applies to the primary licensed users of a band. For example, TV broadcasters are the licensed primary incumbent users of the TV bands. Other licensed users may include wireless microphone users (e.g., operating under FCC Part 74 rules). The parameters of the primary incumbent system can be employed along with the operating regulations and policies for the network and requirements for the band (e.g., allowable primary receiver co-channel interference (C/I) and adjacent channel interference (ACI) levels, as typically determined by regulators), and information about other secondary systems operating in the band to determine favorable operating parameters of another secondary system based on the geographic location. Such operating parameters include desirable frequencies and maximum allowable transmission power.

For example, though a channel may be indicated as available for use by a secondary system at a particular location and specified maximum allowable transmit power level by the geo-location database, other secondary systems nearby may be using the channel. Geo-location databases do not presently consider the effects of secondary systems. Also, the maximum allowed secondary system transmit power level specified by the geo-location database provides no indication as to how free a particular channel is from interference generated by both primary and secondary systems. The channel quality of a channel available for use by a secondary system depends both on the maximum allowable transmit power level and on the interference levels on each channel. In one embodiment, a secondary system may wish to operate on the channel with the highest quality, since use of such a channel will typically result in the best communications range, data throughput, latency or error rates.

The improved geo-location database described herein fully takes into account the effects of primary incumbents as well as other secondary systems operating in the area (including transmitter splatter effects that produce interference on adjacent and alternate channels) to produce estimates of the channel quality for each available channel for operation for a secondary system. Note that, as is commonly understood by one of skill in the art, an adjacent channel is the band of frequencies on either side of the channel in question, generally one channel-width wide, while an alternate channel is the next channel beyond that on either side. For example, for TV in the U.S., if the channel in question is a 6 MHz channel from 500-506 MHz, the adjacent channels are 494-500 MHz and 506-512 MHz, and the alternate channels are 488-494 MHz and 512-518 MHz.

Channel quality is typically estimated per operating frequency (channel or sub-channel—one of a number within a channel) and each potential operating location. The operating location may be based on the location (or potential locations) of the secondary transmitter or the secondary receiver. Note that the geo-location database may be a centrally located database (e.g., accessible via the internet), that could be administered by a $3^{rd}$ party. The estimates of channel quality depend on secondary system proximity to both the primary incumbents and other secondary systems operating in the band, and their operating characteristics (e.g., transmitter device type, location, power level and splatter; antenna height, pattern and polarization; transmitted signal bandwidth and timing). The antenna patterns and heights may include radiating center above ground level (RCAGL), HAAT, pattern rotation, and elevation pattern. In this manner, a secondary system can have knowledge of a channel's quality level (e.g., maximum available link budget) before actually operating on a particular channel.

The geo-location databases possess highly detailed knowledge about the particular transmitters that are active in the band, which can be utilized in various computations. This knowledge includes the above operating parameters. Some examples of transmitter parameter databases that are currently in operation include the FCC consolidated data base system mentioned above and the universal licensing system (ULS) databases. Currently in the U.S., secondary devices in TVWS are required to register/access a third-party geo-location database provider, so these databases can be modified to also contain detailed information about dynamic secondary system operations in the band. The databases may also be modified to use highly detailed knowledge of terrain features (e.g., 30 m terrain features, land clutter databases, etc.). As such, these databases will have information about the systems operating in a particular frequency band and the propagation characteristics in the band. The described channel selection methods can be applied to all variants of database methods (e.g., those databases indicating open channels, those databases indicating maximum available transmit power levels, those databases using detailed terrain data features, etc.). In general, the more information that is available, the better the results of the methods.

Secondary system communications quality (e.g., throughput, range, reliability) is ultimately affected by channel quality, or the maximum available link budget (or link margin) for each channel. Maximum available link budgets for a secondary system are impacted not only by maximum allowed transmit power levels (determined by the database and operating regulations), but also by the aggregate interference levels present on each available channel, which are affected by several parameters, including transmitter power and splatter levels from each active transmitter in the band. Link budgets (or channel quality) are impacted by not only interference from primary (licensed) signal sources, but also interference from secondary (unlicensed) signal sources. Since the databases know the locations and operating characteristics of the incumbent signal sources, as well as secondary signal sources (and their transmit timing), they are able to predict which secondary channels will offer the highest available link budgets on a dynamic basis. A variety of signal propagation models may be used to estimate aggregate interference levels based on the above information. These methods inherently aid coexistence between a multitude of devices in the TV bands, and improve spectral utilization efficiency and system throughput. The dynamic database computational updates may range from days to hours to minutes, depending on, for example, how often the secondary devices may be required to access the database.

As above, the database may also utilize detailed terrain data (e.g., terrain features accurate to within 100 m or better, land clutter databases, etc.) to accurately determine signal strength vs. location. These predictions include transmitter splatter effects, i.e., out-of-band emissions (OOBE) or off-channel emissions, falling on-channel from the various transmitters on adjacent and alternate channels. As the databases have knowledge of the transmitter splatter characteristics of the various primary and secondary transmitters in the band, this allows conservative interference levels to be calculated by the database. For example, in TV bands in the United States, full power digital TV (DTV) transmitters are permitted to emit up to −45 dBr/6 MHz of splatter into the adjacent channel, while low power DTV transmitters are permitted to emit up to −39 dBr/6 MHz of splatter into adjacent channels. This is in contrast to U.S. TVWS transmitters, such as unlicensed cognitive radio transmitters, which are currently only allowed to emit up to −55 dBr/100 KHz of splatter into adjacent channels. These figures can be used to predict interference levels from off-channel transmitters that are active in the band. For example, if a low power DTV transmitter is operating one channel above or below a given TV channel, and has a signal strength of −40 dBm/6 MHz on that adjacent channel (from its on-channel emissions), the low power DTV transmitter's off-channel interference contribution to the channel above or below it would be seen at a −79 dBm/6 MHz level (−40 dBm−39 dBm). This computation can be repeated for all (primary or secondary) transmitters that are active in a band (and also include alternate channel effects).

Figure 4:
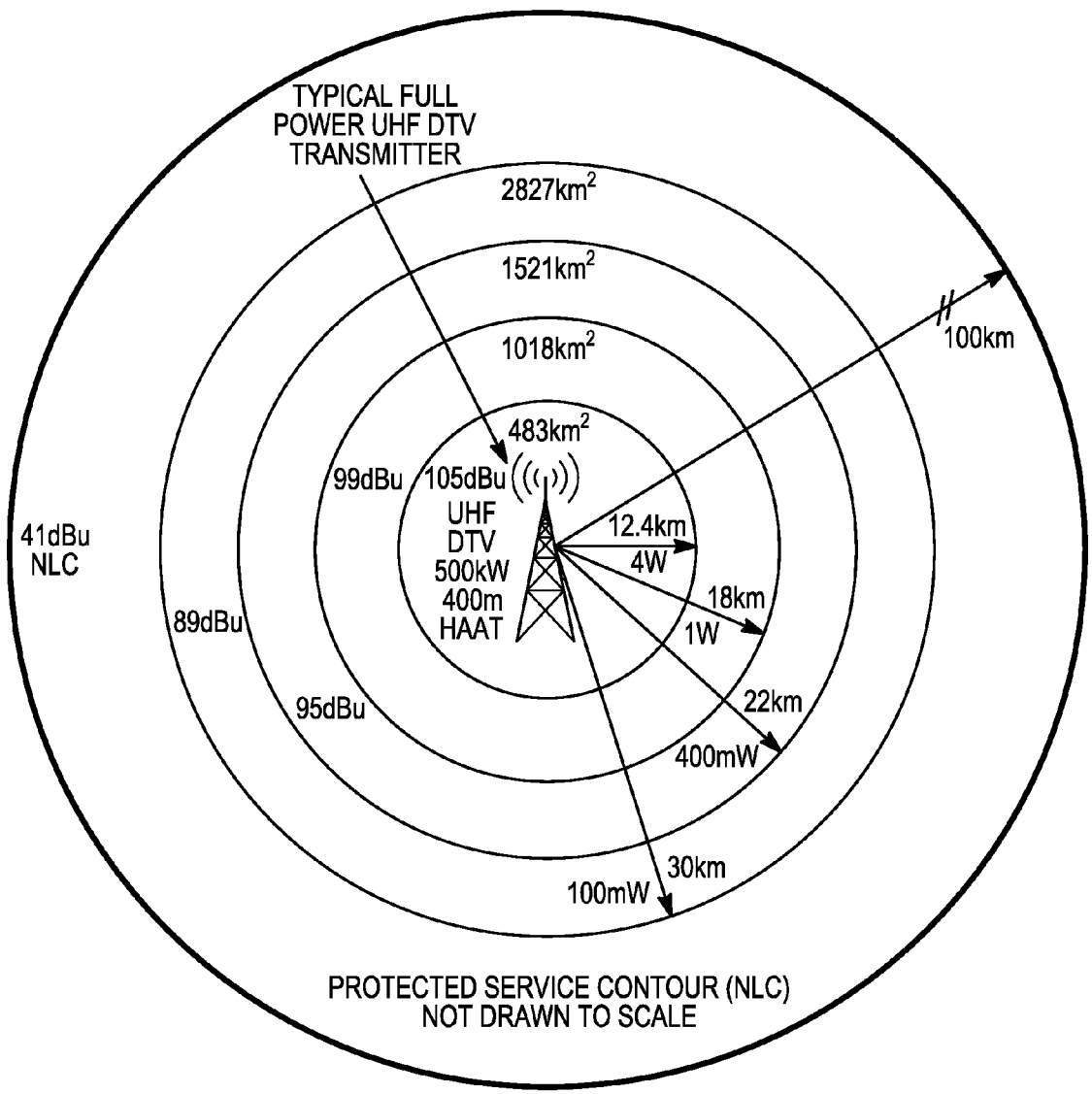
FIG. 4 illustrates an example of communication coverage diagrams in accordance with an embodiment of the database method.

Specifications typically also exist (and differ) for alternate channel OOBE depending on the exact transmitter types (e.g., low-power DTV, low-power analog TV, full-power DTV). The database typically has knowledge of detailed primary and secondary transmitter operating characteristics which are used when computing aggregate interference levels expected on each channel. An example of a predicted received interference level plot from licensed signal sources (without detailed terrain modeling) is shown in FIG. 4. Note that interference effects from adjacent channel transmitters are typically included in the database analysis.

Some signal sources that operate in the bands may be narrowband in nature. One such U.S. example is Part 74 secondary licensed wireless microphone transmitters, which typically occupy 200 KHz bandwidth sub-channels within a 6 MHz TV channel. The database has knowledge of these types of fixed transmitters as well. It can therefore take into account interference effects both to and from these devices. Also note that some of these devices (e.g., wireless microphones, cognitive radio devices) may have a known (fine or coarse) time component to their operation. For example, certain types of wireless microphones may be used in concerts between 7 pm and 11 pm at a particular location or certain cognitive radio devices may be transmitting with a particular synchronous slot structure/duty cycle. As these characteristics are known to the database, this permits coarse expected time of operation characteristics to be employed to protect and predict interference from such operations (e.g., the wireless microphone operations). If desired, accurate system time synchronization (i.e., a high precision timing reference) can be maintained through the use of GPS receivers.

As a secondary transmitter queries the database whenever its location changes by a predetermined amount (e.g., 50 m), the database also has access to knowledge of the mobile secondary transmitter locations. Knowledge of fixed secondary system locations is also typically available through the registration and/or database query process. As described above, database information may be extended to include actual transmit power levels, operational bandwidths, transmit timing, polarization, and frequencies of secondary device operation. This means that the database has accurate information about the location of secondary transmitters in a particular band. These devices can also report the transmit power levels that they are radiating in a particular direction (e.g., based on horizontal and/or vertical antenna pattern data). Of course, TV broadcast operations are typically fixed (i.e., static) in nature, and signal contributions can be pre-computed, dependent on the latest terrain data, and stored to reduce computational complexities. Using modern processing methods employing, e.g., digital signal processors, possibly employing parallelism, such calculations are feasible on a near real-time (dynamic) basis.

As described above, not only can the database compute a maximum allowed transmit power level (termed $P_{max,ch}$) for secondary devices vs. operating location for each channel based on incumbent system locations and incumbent interference tolerance constraints, it can also dynamically compute an aggregate interference level vs. location and channel (termed $RSSI_{max,ch}$). From this information, a predicted maximum available dynamic link budget for a particular location can be derived for each available channel ($LB_{max,ch}$) by:

$$LB_{max,ch} = P_{max,ch} - RSSI_{max,ch} \text{(computed per location \& channel)}$$

This measure is indicative of a maximum tolerable path loss for the given system operational parameters and modulation sensitivity level. Those skilled in the art recognize that while higher order modulations provide higher throughput, they also require higher signal to noise ratios, or higher maximum available link budgets. Note that the maximum available transmit power calculations (per channel, based on device location) are generally specified by the governmental regulators for a particular band, and take into account proximity to primary system transmitters and receivers and specific interference tolerance ratios of those systems. There may be several different types of primary systems present, each with its own interference tolerance requirements (as in the TV bands).

This can be extended to include the interference effects to and from secondary systems, on a more real-time basis. In this manner, secondary devices will have an up-to-date picture of channel quality levels vs. location, based on actual usage of the frequency band. This permits more intelligent channel selections by secondary systems, and even efficient coexistence between such secondary systems. Note that the operating parameters and other relevant information may be gathered from the database at one of a number of different locations (e.g., either the database or the cognitive radio unit) for calculation, which may occur at the same or a different location. In any event, the operating parameters are obtained by accessing the database.

Generally, a secondary device will select channels that offer the highest maximum available link budgets, since that choice will maximize communications throughput, range or reliability. Again, note that detailed terrain data may be taken into account in the above calculations, as well as specific transmit timing information. Advances in computer processing (e.g., parallel/SIMD processing methods) make these methods even more feasible as time goes on. With the use of reduced complexity implementation techniques, e.g., pre-computed radial HAAT data based on detailed terrain data, is also possible to relax the computational requirements. Further, even though the operating frequency possessing the highest estimated channel quality is selected for the cognitive radio unit to operate, another lower quality, channel or frequency may be selected if unexpected interference found on best channel/frequency after the calculation.

Coexistence between the various primary and secondary devices is inherently achieved since the interference calculations take into account aggregate interference levels from co- and adjacent (e.g., N±1, N±2 offset) channel primary and secondary system transmitters. Thus, if a particular secondary system occupies a particular channel at a particular transmit power level, its interference effects can be computed on other nearby (arriving or existing) secondary systems. Transmit timing and polarization effects (e.g., cross-pol isolation) may also be taken into account in the above calculations.

Service priority can be also introduced into the database, with each primary and secondary system having an assigned priority level. In general, channel availability for equal priority services is determined on a first-arriving, first-served basis. In this manner, secondary devices will naturally avoid selecting channels that are already in use by other secondary systems, enforcing an orderly coexistence. The concept of service priority can also be utilized to allow some systems (e.g., emergency public safety systems) to operate with higher priority over other services (e.g., unlicensed wireless microphones). In this manner, the database can provide differing channel lists (and/or other radio operating parameters, such as maximum allowed transmit power levels) based on service priority. For example, at an emergency incident scene, the database may allocate channels to public safety systems that were previously allocated to other lower priority services. When the public safety system arrives on scene, it would access the database, and the database would have the option of assigning channels that are currently utilized by lower priority systems. The lower priority systems would also receive a new set of channels/radio operating parameters for the new spectrum usage scenario. While priority based databases are preferably operated on a near real-time basis, even hourly database updates could potentially provide much more efficient usage of available spectrum.

In addition, predicted interference levels can be adjusted by actual field observations (i.e., sensing results by the primary and/or secondary devices) as long as the devices report those operations to the database. In this manner, the predictive models of the database can be fine-tuned to reflect actual operating conditions at particular locations. For example, if a particular cognitive radio device is receiving higher than expected interference levels from a DTV transmitter on a particular channel, the database can be updated to reflect the higher radiated power in that direction. The offending transmitter may be checked to ensure that it is complying with its regulatory limits or to determine whether the measurement is merely an anomaly. In some cases, there may be unauthorized rogue transmitters operating in the band. In any case, the database can reflect actual observed operating characteristics in the band, providing an up to date accurate picture of current spectral operations. It can even aid regulatory officials in enforcement actions, which would be highly desirable to both the users and officials for a particular band.

FIG. 1 illustrates one embodiment of a wireless communication network 100. The communication network 100 includes a secondary system 102 operating so as not to interfere with incumbent system 104 or other secondary systems 106. The secondary systems 102 and 106 may be, for example, cognitive radio systems. The cognitive radio system 102 includes at least one cognitive radio unit. A cognitive radio unit can be either a cognitive radio subscriber device 108 or a cognitive radio base station 110 that serves cognitive radio subscriber devices 108. The cognitive radio subscriber device 108 may be a mobile device, such as a portable two-way radio, a vehicle mounted radio, or may be a fixed radio (or customer premise equipment (CPE)). Although the cognitive radio base station 110 is generally a stationary device, in some cases, it may be portable depending upon the type of system.

In operation, cognitive radio subscriber devices 108 communicate directly with each other and/or via the cognitive radio base station 110. Examples of wireless communication networks within which the cognitive radio units are employed, include pubic safety networks (both wide area networks and vehicular area networks), home wireless networks, and wide-area wireless broadband networks. The cognitive radio units co-exist with the incumbent system 104 and the other cognitive radio system 106 (if present).

Each cognitive radio unit 108, 110 includes a transmitter 112 and a controller 114. The cognitive radio units 108, 110 rely on geo-location information 116 from the geo-location databases and are supplemented with geo-location algorithms contained in a memory of the controller 114 to determine the cognitive radio system operating parameters (e.g., transmission frequency, allowed transmission power, operational bandwidth, transmit time duration, polarization, etc.). These parameters are dependent on the location of the cognitive radio units 108, 110 and may be calculated in real-time at a central geo-location database or in the cognitive radio unit (when system parameter information is available about primary and secondary systems operating in the band). This information is typically computed periodically and stored in a central geo-location database. The computations may be triggered when the cognitive radio unit arrives at a particular location or when a change in the location of the cognitive radio unit is sensed, e.g., by the cognitive radio unit. Generally speaking, the geo-location database estimated channel quality will vary with each possible system operating location and frequency.

Figure 2:
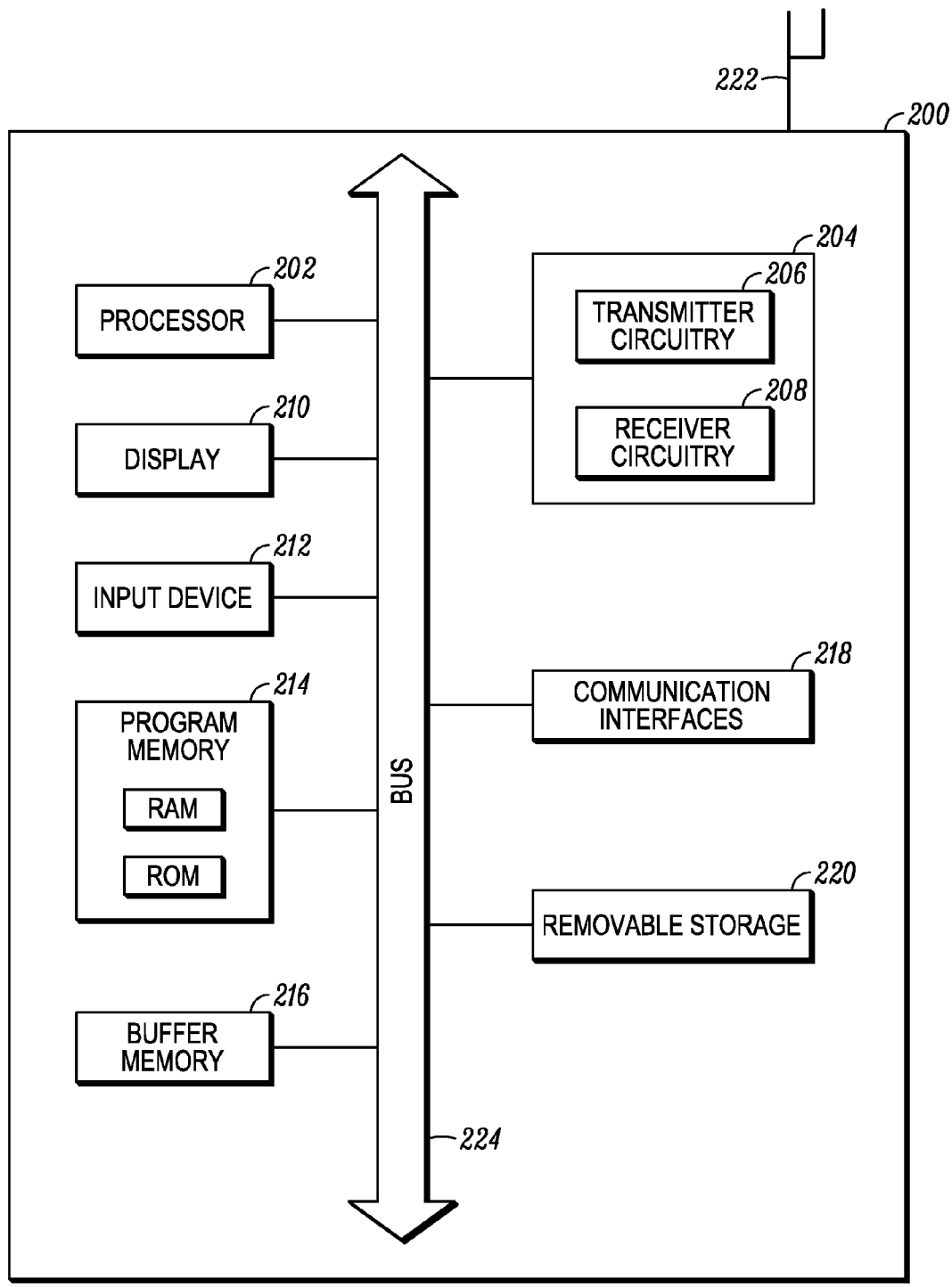
FIG. 2 illustrates a block diagram of an embodiment of a mobile cognitive radio unit.

One example of a block diagram of a mobile cognitive radio unit is shown in FIG. 2. The cognitive radio unit 200 contains, among other components, a processor 202 (e.g., controller 114), a transceiver 204 including transmitter circuitry 206 and receiver circuitry 208, an antenna 222, a display 210, an input device(s) 212, a program memory 214 for storing operating instructions that are executed by the processor 202, a buffer memory 216, one or more communication interfaces 218, and a removable storage 220. The cognitive radio unit 200 is preferably an integrated unit containing at least all the elements depicted in FIG. 2, as well as any other element necessary for the cognitive radio unit 200 to perform its electronic function. Alternatively, the cognitive radio unit 200 may comprise a collection of appropriately interconnected units or devices, wherein such units or devices perform functions that are equivalent to the functions performed by the elements of the cognitive radio unit 200.

The processor 202 preferably includes one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the device 200 are described in detail below.

The transmitter circuitry 206 and the receiver circuitry 208 enable the cognitive radio unit 200 to communicate with other communication devices. In this regard, the transmitter circuitry 206 and the receiver circuitry 208 include appropriate circuitry to enable digital or analog transmissions over a wireless or wired communication channel. The implementations of the transmitter circuitry 206 and the receiver circuitry 208 depend on the implementation of the cognitive radio unit 200. For example, the transmitter circuitry 206 and the receiver circuitry 208 may be implemented as appropriate transmitting and receiving components of one or two-way wireless communication devices. In a wireless communication device, for example, the transmitter and receiver circuitry 206, 208 may be implemented as part of the wireless device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The transmitter and receiver circuitry 206, 208 are capable of transmitting/receiving RF signals in multiple bands so that the cognitive radio unit 200 is able to communicate over any of the allowable bands of the system.

The antenna 222 comprises any known or developed structure for radiating and receiving electromagnetic energy in the frequency range containing the wireless carrier frequencies. The buffer memory 216 may be any form of volatile memory, such as RAM, and is used for temporarily storing received information. The display 210 may be an LCD, OLED, or any other known display. The input devices 212 include one or more speakers and microphones and may further include an alpha-numeric keyboard, isolated buttons, soft and/or hard keys, touch screen, jog wheel, and/or any other known input device.

Turning back to the manner in which the secondary device operates, as indicated previously, the FCC presently requires that geo-location databases be accessed by a secondary device before they use an open channel in the TV spectrum in the U.S. This concept is extended so that the databases are used to predict the best channels available for use (those with the highest channel quality, not just open channels) by the secondary device such as the cognitive radio unit in the presence of primary incumbent and other secondary cognitive radio devices. Thus, the geo-location databases may provide a list of available channels for a particular operating area as well as the maximum available transmission power levels vs. location per channel at a particular time, as well as an estimated available link budget or link margin. Other secondary radio operating parameters such as center frequency (within a radio channel), maximum operational bandwidth, transmit polarization and timing may also be supplied by the database to facilitate better use of available spectrum and improved coexistence between systems. This channel list may be limited initially by the cognitive radio unit, which may send a preselected list of one or more desired channels within its frequency band(s) of operation to the geo-location database.

Regulatory bodies such as the FCC typically maintain information about licensed incumbent systems (e.g., primary incumbents such as TV transmitters, as well as secondary incumbents such as CFR 47 Part 74 low power auxiliary devices—for example wireless microphones), which is utilized in the geo-location database. As mentioned above, some specific examples of such incumbent system databases are the FCC CDBS and ULS databases, whose information stored may include ERP, operating frequency, antenna pattern (including elevation and rotation), HAAT, RCAGL, service designation, and physical transmitter operating locations in a given band. Tables 1 and 2 show an example of FCC-maintained licensed TV transmitter parameters and sample data, and typical allowable interference levels and propagation models, respectively.

TABLE 1

FCC-maintained licensed TV transmitter parameters and sample data

| | |
|---|---|
| Licensee | WXYZ-TV Broadcasting, Inc. |
| FCC Service Designation | DT - Digital television station |
| Channel | 26 (542-548 MHz) |
| File No. | ABC-2002 |
| CDBS Application ID No.: | 65680 |
| Transmitter Location: | 39° 39' 55.00" N Latitude |
| | 77° 02' 6.67" W Lon |
| Antenna ID No: | 55236 |
| Polarization | Horizontal |
| Effective Radiated Power (ERP) | 1000 kW |
| Antenna Height Above Mean Sea Level | 550 meters |
| Antenna Height Above Average Terrain | 358.2 meters |
| Antenna Radiating Center Above Ground Level | 350.8 meters |
| Directional Antenna | pattern rotation: 90 degrees |
| Relative Field Values for Directional Antenna | 0 degrees: 0.991; |
| | 10 degrees: 0.931; |
| | ... |
| | 290 degrees: 0.962 |
| | 350 degrees: 0.975 |

TABLE 2

Typical allowable interference levels and propagation models

| Type of station | Channel separation | Protection ratios D/U ratio (dB) | Propagation curve |
|---|---|---|---|
| Analog TV, Class A, LPTV, translator and booster | Co-channel | 35 | F (50, 50) |
| | Upper adjacent | −17 | F (90, 90) |
| | Lower adjacent | −15 | F (90, 90) |
| Digital TV and Class A DTV | Co-channel | 23 | F (50, 90) |
| | Upper adjacent | −26 | F (90, 90) |
| | Lower adjacent | −28 | F (90, 90) |

As seen in Table 2, the different incumbent systems can tolerate different interference levels. These interference levels may depend, for example, on the type of transmitter or receiver, where the interference is present within the frequency band, and the location within the coverage area where the interference occurs. The broadcaster's transmitter parameters are used to compute, for example, the broadcast user's (e.g. TV sets) signal strength vs. geographic location, given a set of generally accepted propagation models (such as FCC approved F(50,90) propagation models). Similarly, predefined protected service contour levels (defined per type of transmitter station) determine each station's protected service contour (or operational area). These parameters are typically frequency dependent.

In addition to those parameters shown in Tables 1 and 2, other broadcast system parameters, such as transmitter elevation patterns, tolerable receiver alternate channel interference levels, etc., stored in the geo-location databases may also be considered in determining operating parameters (e.g., maximum allowable transmit power level) of the secondary system (e.g., public safety cognitive radio system).

The use of the database, which contains information of the various devices in the primary and secondary incumbent systems, permits estimation of the distance between a particular secondary transmitter and primary and secondary devices. Proximity to the incumbent devices ultimately determines the maximum transmission power levels that the particular secondary transmitter can transmit without causing interference to primary services. The determination of maximum allowed transmission power and other operating parameters may be based on various non-interference requirements and the above generally accepted propagation models. The generally accepted propagation models, however, only provide statistical average data for signal reception, and are subject to errors in the field due to a variety of reasons (e.g., terrain variations, antenna variations, etc.). Thus, while propagation models, such as the FCC's F(50,50), F(50,90) and F(90,90) models referenced in Table 2 are well-accepted, they are only statistical indicators of expected field strength and received signal strength (RSSI) levels for a particular transmitter, given an antenna gain. Actual RSSI can vary based on a wide variety of actual operating conditions, including terrain variations, environmental conditions, achieved antenna patterns/gains, etc. The terrain data may be highly detailed and include terrain features accurate to within 30 m or better, as well as land clutter information. Similarly, typical primary receiver interference tolerance levels may vary vs. time as well (e.g., due to improvements in receiver technologies). Since these characteristics and propagation models are used to determine the protected service area for primary incumbent users and allowable secondary interference levels, it is desirable to maintain their accuracy using periodically updated geo-maps (such as that provided by various commercial entities) and system operating characteristics.

As mentioned above, the geo-location database can predict interference both due to on-channel primary and secondary transmitters and transmitter splatter (OOBE) effects falling on-channel from primary and secondary transmitters operating on adjacent and alternate channels. The geo-location database can contain prior knowledge of the transmitter splatter characteristics of the various transmitters operated in the bands. Alternatively, the devices themselves could report their operating transmitter characteristics to the database. In this manner, the geo-location database is able to estimate the total interference level on a particular channel, considering both co-channel and adjacent channel effects from primary incumbent transmitters and secondary cognitive radio transmitters in a given area. For example, an unlicensed secondary device with a poor transmit spectral mask operating two channels away in frequency, but in close proximity to another secondary cognitive radio device, may cause a significant amount of interference to the other cognitive radio device, and significantly lower the channel quality of a previously available (or desirable) channel. The geo-location database could compute these effects, and report the estimated drop in channel quality to the other secondary cognitive radio device operating in the area. These types of calculations can be done on a near real-time basis, as long as the secondary cognitive radio devices report their operating channels (and possibly other system operating parameters such as transmit power level, transmit timing, antenna pattern, or polarization) to the database.

Previous geo-location databases, however, attempted to protect only the primary licensed incumbents from harmful interference generated from opportunistic secondary systems. Such methods are extended in the embodiments presented here to protect not only primary incumbent systems, but also the secondary systems operating in the same frequency band. The described methods use computational results that depend on the proximity of various primary and secondary devices (e.g., the transmitters and receivers of the primary incumbent systems, and the transmitters of secondary systems) as well as the channels already used and transmission power of the various devices. As there may be several different types of primary and secondary systems present, each with its own interference tolerance requirements, the various computations can be parallelized to decrease processing time and provide the calculations on a near real-time (dynamic) basis. In addition, reduced complexity implementation techniques (e.g., the use of pre-computed protected service contours, use of pre-computed radial HAAT data based on detailed terrain data) is also possible to relax the computational requirements. Different modeling techniques can be applied to compute the various aggregate RF operational interference levels including the use of various propagation and transmitter splatter models, without departing from the spirit of the invention. Note that the regulatory body for the particular band (e.g., the FCC) will typically specify the interference protection ratios and the signal propagation models used to assure interference protection to the incumbents in the band.

Figure 3:
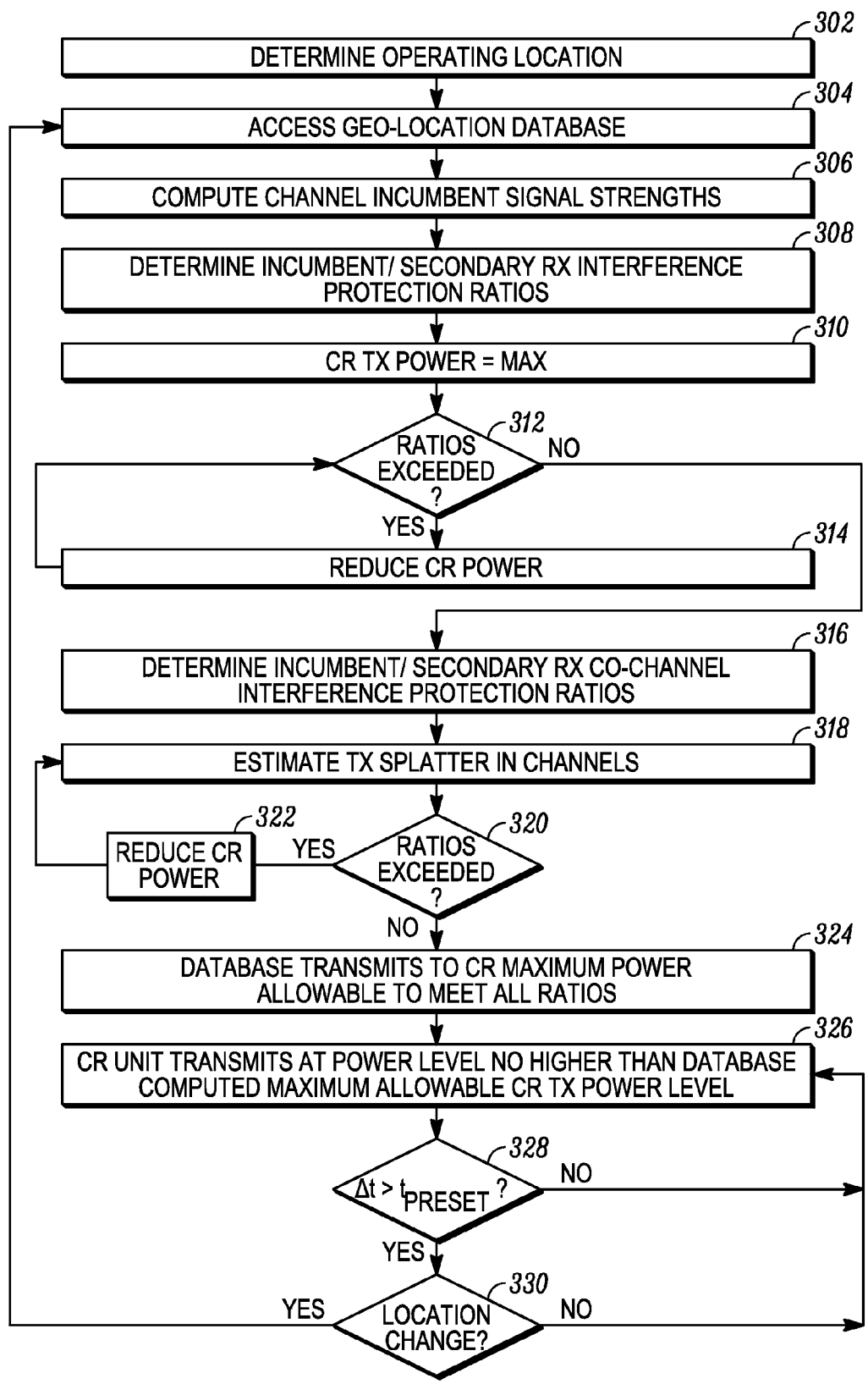
FIG. 3 illustrates a flowchart of an embodiment of a method for determining and updating maximum allowable cognitive radio transmitter power.

Regarding an example of secondary device allowed transmission power levels, FIG. 3 illustrates one embodiment of a flow chart covering example calculations used for computing maximum allowed transmission power levels based on the proximity of the cognitive radio unit to other primary and secondary incumbent communications services. As shown, the cognitive radio unit determines its operating location at step 302, through GPS, triangulation, or other network means (e.g., assisted GPS, time difference of arrival methods, etc.). After determining its location, the cognitive radio unit accesses the geo-location database at step 304. When the database has been accessed, the identity, location and other characteristics (such as prioritization, maximum power that the cognitive radio unit is able to transmit, desired operation channel) of the cognitive radio unit are provided to the database.

The database has information stored about the primary incumbent systems and other secondary systems (and associated units) in the network. Once the new information about a cognitive radio unit (i.e., system operational parameters) has been provided to the database, the database then computes adjacent (and possibly alternate) channel incumbent signal strengths based on the location and standard propagation models at step 306. This calculation may be performed by processors at the central database or in each cognitive radio unit if the unit had sufficient processing power and access to the incumbent and secondary system operational data. Alternatively, the computations could be performed locally in the cognitive radio units themselves, or another alternate location, as long as the computing entity has access to the same system parameter information (about incumbents and secondary systems) as the database. In the preferred embodiment, the algorithms used in the calculations may reside in the database processor memory. Typically, maximum allowable transmit power level is limited by proximity to licensed incumbents (e.g., and their estimated signal strength at a given location), and the incumbent receiver's interference tolerance ratios. In another example, the maximum allowable transmission level of the cognitive radio unit may be initially limited such that it is proportional to the estimated primary and secondary incumbent system signal strength levels at the location of the cognitive radio unit (e.g., when operating on an adjacent channel to those services).

At step 308, the database recalls from its memory all primary and higher priority secondary and primary incumbent-specific interference protection ratios (also called desired-to-undesired signal ratios, or D/U ratios). Such specifications may be provided by governing bodies such as the Advanced Television Systems Committee (ATSC) or National Television System Committee (NTSC) for television incumbents, and/or specified by regulatory agencies. The database may use the service priorities of the cognitive radio unit and other incumbent systems, if present, to determine which systems have transmission priority over the cognitive radio unit. The priorities may be determined by function (e.g., emergency service provider transmitters have priority over wireless microphones) and/or seniority (first-arriving, first-served basis). If the priorities of the cognitive radio unit and/or other secondary incumbent systems are unavailable or are equal, the database may use seniority to determine the salient interference protection ratios. Alternatively, the database may use the interference effects from all the secondary incumbent systems established to set a conservative estimate of the maximum transmission power of the cognitive radio unit.

Once all of the pertinent receiver interference specifications are determined, the database determines the maximum of the transmission power of the cognitive radio unit to meet these specifications for all computed protected signals in the area (e.g., on adjacent, alternate, and beyond channels), using the location information of the various transmitters, along with pre-determined propagation models. This entails, as shown, the database using existing primary and secondary system operational parameters as well as the existing maximum transmission power of the cognitive radio unit at step 310, determining whether any of the ratios have been exceeded at step 312 and, if so, reducing the allowable maximum transmission power at step 314 before determining whether the new maximum transmission power again exceeds any of the ratios. Any of a number of algorithms can be used to determine the desired power reduction, e.g., by monotonically decreasing the transmission power until an appropriate maximum transmission power level is determined. In this manner, both primary and (higher priority) secondary systems can be protected against harmful interference. Note that primary incumbent transmitters, such as TV broadcast operations, are typically static—thus such signal contributions can be pre-computed (dependent on the latest terrain data) and stored to reduce computational complexities.

Figure 5:
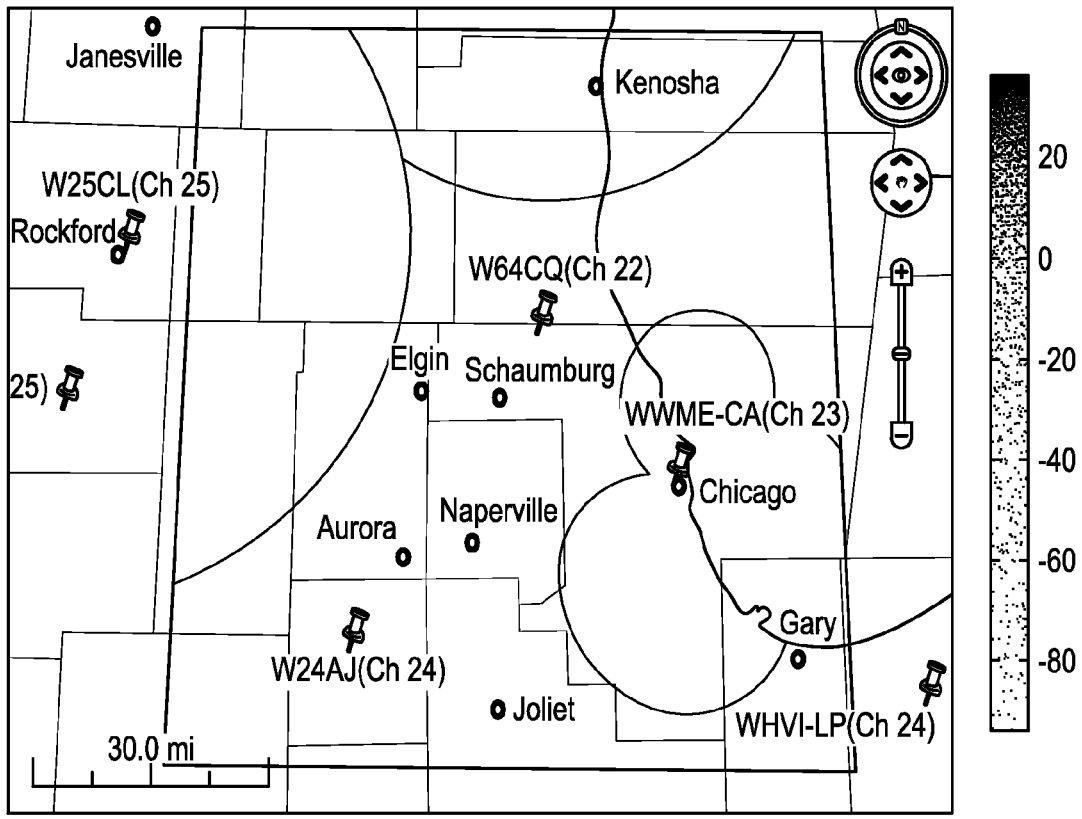
FIG. 5 provides an example of a cognitive radio transmit power versus location map for a particular operating channel.

FIG. 4 illustrates one example of variable power operation inside of an adjacent channel contour for an incumbent with an omni-directional transmit antenna based on the original FCC-proposed TVWS operating rules. FIG. 5 shows a plot of the maximum allowed cognitive radio (TV whitespace device) transmission power (in dBm) vs. device operating location for a particular channel (Channel 23) in the Chicago area, based on primary system incumbents (TV broadcasters, shown as thumbtacks) in the area. Note the highly variable allowed cognitive radio transmission power levels vs. location (e.g., inside of adjacent channel contours, co-channel contours, etc.).

Figure 6:
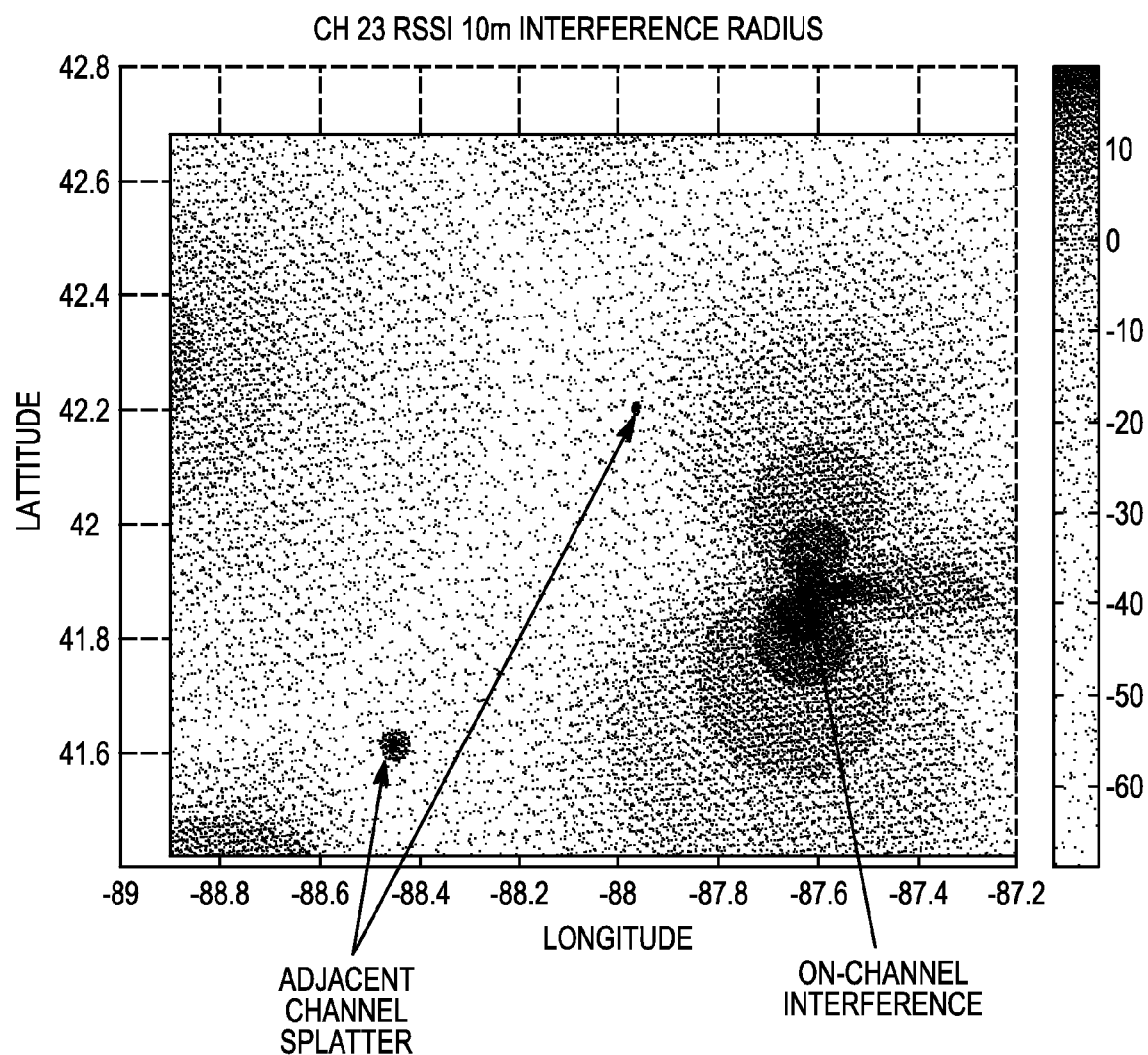
FIG. 6 provides an example of an interference power versus location map for a particular operating channel.

An example of a plot of predicted interference levels for Channel 23 from licensed transmitter sources (without detailed terrain modeling) is shown in FIG. 6. Interference effects from adjacent channel transmitters are included in the analysis. Note that the predicted interference levels would also typically contain information about secondary (e.g., unlicensed) transmitters operating in the band. The small circles (e.g., around the −88.4/41.6 longitude/latitude, and −87.95/42.15 longitude/latitude points) represent adjacent channel splatter from adjacent channel low-power transmitters, while the other denoted areas indicate interference from on-channel transmitters. Detailed information is known about the various primary and secondary incumbent transmitters operating in the band although detailed terrain data was unavailable (but may also be utilized). As above, the expected interference levels from FIG. 6 (determined vs. location) can be subtracted from the maximum allowed transmission power levels of FIG. 5 (determined vs. operating location) to obtain an estimated available link budget for the channel. As illustrated in FIGS. 5 and 6, the computational results can be quite dynamic vs. operating location, a fact especially emphasized when multiple channels are considered.

The database also determines at step 316 co-channel interference protection ratios for all primary and higher priority secondary systems operating on nearby channels (e.g., adjacent, and possibly alternate) from the channel on which the cognitive radio unit is to operate. Note that the channel of operation may either be selected by the database or by the cognitive radio unit. In the latter case, a list of all of the permissible channels may be presented to the cognitive radio unit, along with estimated channel quality levels for each channel, the database performing calculations for these channels and providing them to the cognitive radio unit along with the channels that are accessible. The cognitive radio unit may select a particular channel among the list automatically using pre-programmed selection criteria for the desired best link characteristics (possibly using different weighting of the criteria) or manually, displaying the available channels and transmission characteristics to the user on the screen of the cognitive radio unit and allowing the user to select the desired channel through one of the I/O devices. The transmission characteristics (such as allowable maximum transmission power level) and the aggregate interference levels generally vary dependent on the channel selected. The cognitive radio unit (or the database) will typically select a channel that has the highest estimated available link budget (or channel quality level) for use by the secondary cognitive radio system, though other constraints (such as locally measured interference levels) may cause the selection of a secondary (lower estimated quality) channel.

The cognitive radio unit also periodically determines whether its location has changed. Specifically, in the embodiment shown, the cognitive radio unit determines whether a predetermined time period has passed at step 328. While this time period may typically be daily or even hourly, it can be reduced to several minutes or even several seconds. The reduction in time period may depend for instance on inputs from an accelerometer in the cognitive radio unit or the proximity of the cognitive radio unit to an established boundary. Thus, in these cases, as its speed/velocity unit increases or as it nears a boundary, the cognitive radio unit may check its location more frequently.

If a pre-determined database update time period has not been exceeded, the cognitive radio unit continues to use the revised maximum transmission power when transmitting. If the predetermined time period has passed, the cognitive radio may check its location at step 330. If the time period is exceeded while the cognitive radio unit is transmitting, the cognitive radio unit may again access the database (and provide its current system operating parameter information to the database), which again determines whether to adjust the maximum transmission power level of the cognitive radio unit, and informs the cognitive radio unit of any required operational parameter changes (e.g., due to the arrival of a higher priority transmitter). Also, if at any time the cognitive radio unit changes its transmit power level (or other operational characteristics, e.g., based on actual channel conditions), it reports the change to the controlling geo-location database. As above, current FCC regulations require a secondary system device to query the database whenever its location changes by 50 m. The cognitive radio unit (or geo-location database) typically periodically updates all computed incumbent signal strengths, aggregate interference levels, and estimated channel quality levels.

The available channels (and other secondary system operating parameters) may be dynamically allocated by the database based on service priority level, resulting in lists of available channels differing in real time (or near real time). As described above, emergency public safety systems may operate with higher priority than unlicensed wireless microphones. Thus, at an emergency incident scene, the database may re-allocate to a newly-arrived public safety system channels that were previously allocated to other lower priority services (e.g., the microphones). This is to say that when the public safety system arrives on scene of the incident and accesses the database, the database has the option of assigning channels that are currently used by lower priority systems. If the channels used by the lower priority systems are re-allocated, the lower priority systems receive a new set of channels (containing any available channels, and eliminating those previously available channels that are newly utilized by higher priority systems) and radio operating parameters for the new spectrum usage scenario on a near real-time basis.

Furthermore, as mentioned above with regard to the interference levels, transmitter splatter levels estimated by the database can be adjusted by actual field observations (i.e., sensing results) as long as the primary and secondary incumbent devices reliably report those operations to the database. In this manner, the predictive models of the database can be fine-tuned to reflect actual operating conditions at particular locations. For example, if a particular cognitive radio unit is receiving higher than expected interference levels from another cognitive radio system on a particular channel, the database can be updated to reflect the higher transmitter splatter levels from that system. Alternatively, the offending transmitter may be checked to ensure that it is complying with its regulatory limits.

Figure 7:
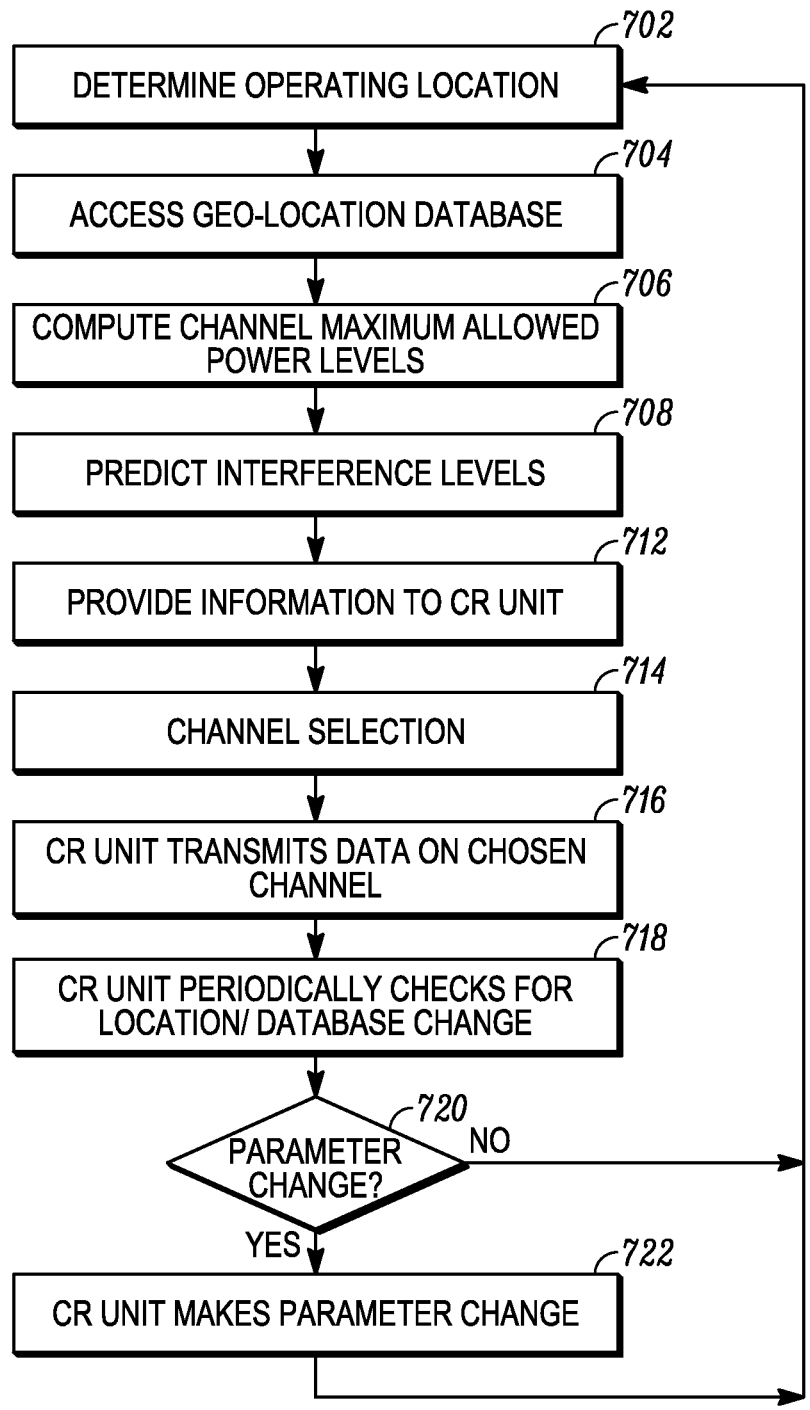
FIG. 7 illustrates a flowchart of an embodiment of a method choosing an operating channel based on predicted interference and allowed transmit power levels.

FIG. 7 illustrates a flow chart for dynamic prediction of link budget vs. location vs. channel for a database-querying cognitive radio unit. Similar to the method of FIG. 3, the cognitive radio unit first determines its operating location at step 702 and then accesses the geo-location database at step 704. As before, detailed operating characteristics of the cognitive radio unit (e.g., transmit power, timing, and splatter levels; operational frequency, bandwidth, etc.) are provided to the database. At step 706, the database computes the maximum allowed transmission power levels for each channel for the given operating location of the cognitive radio unit typically based on prescribed operating regulations for the band. At step 708, the database computes predicted aggregate interference levels for each channel for the given operating location of the cognitive radio unit based on the primary and secondary transmitter operating characteristics. As described above, these characteristics may include timing and priority characteristics. At step 710, the database predicts the channel quality for the cognitive radio unit for each channel.

The database then provides the information to the querying cognitive radio unit at step 712. The channel is selected at step 714. As above, the cognitive radio unit may choose the optimal channel automatically or manually or this channel may be assigned by the database. The cognitive radio unit also indicates to the database the dynamic operating characteristics after the channel is selected, periodically updating these characteristics and sending them to the database. After selection of the channel typically with the highest predicted channel quality, the cognitive radio unit transmits data on the selected channel at step 716. The cognitive radio unit operates using desired transmission characteristics such as transmission power up to the maximum level determined by the database.

During operation, the cognitive radio unit periodically checks for location or other database changes at step 718. The database periodically updates the allowable maximum transmitter power and predicted link budgets vs. time according to the operating characteristics of the cognitive radio unit as well as other characteristics of the primary and secondary systems. This permits adjustment of the cognitive radio unit parameters (such as channel selection) if other secondary systems that impact the cognitive radio unit (e.g., higher-priority secondary systems) enter or leave the area. The cognitive radio unit thus determines whether a parameter change is to be performed (either being controlled by the database or using the new information from the database and deciding on its own) at step 720 and, if so, changes the operating parameters at step 722. In any event, the cognitive radio unit then returns to step 702 after determining that its location has changed. Note that some of the steps shown in FIG. 3 may be present (e.g., specifics about the database functionality and timing) but not explicitly included in FIG. 7 for brevity.

In summary, as above, one or more databases possess detailed knowledge about the primary and secondary systems and devices therein that are active in a particular frequency band at a specific time. This information can be used in various channel quality computations. Secondary system devices in TVWS are required to register/access with the database provider, which permits the databases to contain detailed information about dynamic secondary system operations in the frequency band such as location, actual power levels, bandwidths, and frequencies of operation. As such, the databases have up-to-date information about the incumbent systems operating in the frequency bands and the propagation characteristics in these frequency bands. Channel selection methods can be applied to all variants of database methods including databases indicating open channels or maximum available transmission power levels, and using detailed terrain data features.

Such information permits the channel quality/link margin (maximum available link budget) for each channel to be determined. The quality (e.g., throughput, range, reliability) of communications in a system is ultimately affected by the channel quality/link margin for each channel. The maximum available link budgets for a secondary system are impacted not only by maximum allowed transmission power levels, but also by the aggregate interference levels present on each available channel. Thus, these budgets are impacted by interference from primary and secondary incumbent signal sources. Since the geo-location databases (or the cognitive radio units themselves) know the locations and transmission characteristics of both licensed and unlicensed signal sources, they can predict which channels will offer the highest available link budgets on a dynamic basis. This permits secondary devices to have an up-to-date picture of channel quality levels vs. location, based on actual usage of the frequency band, thereby allowing more intelligent channel selections by the secondary systems (generally, channels that offer the highest maximum available link budgets, since that choice maximizes communications throughput, range or reliability). Such methods inherently aid coexistence between a multitude of devices in different primary and secondary incumbent systems in the various frequency bands such as TVWS, and improve spectral utilization efficiency and system throughput in a dynamic fashion.

The method above may be implemented in numerous products such as cognitive radio and TVWS products. Some examples include broadband wireless internet service products, WLAN (e.g., 802.11 based) products, and WiMax (e.g., 802.16 based) TVWS communications systems (for both wide area and vehicular area networks). The methods also apply to meshed cognitive radio networks. In addition to the TV bands currently considered, several other national and international bands may also be opened for cognitive radio use in the near future. Such bands include the NTIA Spectrum Sharing Test Bed (380-420 MHz) and the 3.6 GHz band. The method described above may also be applied to developing and potential IEEE Standards for TVWS (e.g., IEEE 802.22, 802.11y, and 802.16h).

In various embodiments discussed herein, some of the disclosed methods may be implemented as a computer program product operating on one or more conventional processors. The unique stored program instructions forming the computer program product control the processors to implement, in conjunction with certain non-processor circuits, some, most, or all of the functions previously described. The non-processor circuits may include, but are not limited to, a radio transceiver, signal drivers, clock circuits, power source circuits, and user input devices. As such, these functions may be interpreted as steps of a method for communication systems to share spectrum. Alternatively, some or all functions could be implemented by a state machine that has no stored program instructions, or in one or more application specific integrated circuits (ASICs), in which each function or some combinations of certain of the functions are implemented as custom logic. Of course, a combination these approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The computer program product may include a series of computer instructions fixed either on a tangible medium, such as a computer readable medium (e.g., flash memory, CD-ROM, ROM, fixed disk). The medium may be a tangible medium (e.g., optical or analog communications lines). The series of computer instructions embodies all or part of the functionality previously described herein with respect to the device. It should appreciate that such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of predicting an available link budget information for a secondary device operating in a spectrum of a primary system, the method comprising:
   gathering operating characteristics of the primary system and at least one of a plurality of secondary devices in a geo-location database, wherein the operating characteristics comprise at least a transmitter splatter level, transmitter location, antenna height, and antenna pattern, for the primary system and the at least one secondary device;
   computing, based on the operating characteristics in the geo-location database, an allowed transmission power level at a first location for a specified operating frequency of a first secondary device of the plurality of secondary devices, wherein the allowed transmission power level is computed based on allowable harmful interference levels to the primary system and proximity of the first secondary device to the primary system;
   predicting, based on the operating characteristics in the geo-location database, an aggregate interference level at a second location for the specified operating frequency of a second secondary device of the plurality of secondary devices;
   predicting an available link budget at the second location for the specified operating frequency based on the difference between the computed allowed transmission power level at the first location and the aggregate interference level at the second location.

2. The method of claim 1, further comprising selecting an operational frequency that has the highest predicted available link budget.

3. The method of claim 1, wherein the aggregate interference level is predicted based on at least one of on-channel emissions or off-channel emissions of the primary system.

4. The method of claim 1, wherein the aggregate interference level is predicted based on at least one of on-channel emissions or off-channel emissions of other secondary devices operating in the spectrum of the primary system.

5. The method of claim 1, wherein at least some of the operating characteristics are gathered from a regulatory database.

6. The method of claim 1, wherein at least some of the operating characteristics are reported to a central database.

7. A method of determining operating characteristics for secondary system usage in a network containing a geo-location database, a primary incumbent system and secondary devices, the database containing information of the primary incumbent system and secondary devices including locations of transmitters and receivers of the primary incumbent system and locations of the secondary devices, the method comprising:
   determining a first location of a secondary transmitter;
   providing to the database transmitter information including the first location of the secondary transmitter and a frequency band of operation of the secondary transmitter;
   the database:
      determining an allowable transmission power at the first location of the secondary transmitter for a channel in the frequency band of operation to meet interference tolerance specifications at the location of at least one of the primary receivers, wherein determining the allowable transmission power of the secondary transmitter is based on the transmitter location, a transmitter splatter level, antenna height, and antenna pattern, for the primary and secondary transmitters, further wherein the allowable transmission power is determined based on allowable harmful interference levels to the primary incumbent system and proximity of the secondary transmitter to the primary system;
      indicating the allowable transmission power level and an allowable transmission channel in the frequency band of operation for the first location of the secondary transmitter to the secondary transmitter;
   predicting an aggregate interference level at a second location of a secondary receiver based on on-channel and off-channel emissions of the primary and secondary transmitters; and
   predicting an available link budget for the channel at the second location of the secondary receiver based on the difference between the allowable transmission power level at the first location and the predicted aggregate interference level at the second location.

8. The method of claim 7, wherein the secondary transmitter transmits on a transmission channel that has the highest predicted available link budget.

9. The method of claim 7, wherein a transmission channel on which the secondary transmitter transmits is determined by the database.

10. The method of claim 7, further comprising periodically providing operating characteristics of the secondary transmitter to the database after selection by the transmitter of a transmission channel on which the secondary transmitter transmits.

11. The method of claim 7, wherein a transmission channel on which the secondary transmitter transmits is contained within a list of permissible transmission channels indicated to the secondary transmitter, each of the channels in the list of permissible transmission channels is in the frequency band and meets specifications for the frequency band set by a governing body, and the permissible transmission channels list further includes channels other than open channels, the method further comprising the secondary transmitter selecting the transmission channel from the list of permissible transmission channels.

12. The method of claim 7, wherein:
   determination of the allowable transmission power comprises the database:
      estimating channel incumbent signal strengths based on the location of the at least one of the primary receivers;
      determining whether adjacent and co-channel interference protection ratios for the at least one of the primary receivers are met by the secondary transmitter operating at an initial transmission power level, the adjacent channel interference protection ratios at least meeting adjacent and co-channel interference specifications for the at least one of the receivers as set by a governing body;
      if the adjacent and co-channel interference protection ratios are not met by the secondary transmitter operating at the initial transmission power level, reducing the allowable transmission power level of the secondary transmitter from the initial transmission power level until the adjacent and co-channel interference protection ratios are met.

13. The method of claim 7, wherein the aggregate interference level comprises interference contributions from co- and adjacent channel primary and secondary transmitters.

14. The method of claim 13, further comprising:
measuring actual interference levels at the first location of the secondary transmitter caused by the primary and secondary transmitters; and
updating predictions of the interference contributions in the database based on the measured interference levels.

15. The method of claim 7, wherein the network contains a plurality of at least one of primary or secondary incumbent systems, the database determining the allowable transmission power to meet interference tolerance specifications for all primary incumbent systems as well as any secondary incumbent systems of higher priority than the secondary system containing the secondary transmitter.

16. The method of claim 15, further comprising the database determining priorities of all secondary systems in the network, the priorities of the secondary systems being based on at least one of function or seniority.

17. The method of claim 15, further comprising the database dynamically allocating channels for transmission by the secondary transmitter using priorities of the secondary systems such that the secondary transmitter is reallocated to a different channel if the database determines that a transmitter of a secondary system having a higher priority is to use a channel currently allocated to the transmitter for transmission.

18. The method of claim 7, further comprising the secondary transmitter periodically determining whether its location has changed and, if so, sending the changed location to the database for determination by the database as to whether to adjust the allowable transmission power level.

19. The method of claim 1, wherein the method of predicting the available link budget for a secondary device operating in a spectrum of a primary system depends at least on the proximity of transmitters and receivers of one or more primary systems, and transmitters of one or more secondary devices.

20. The method of claim 7, wherein the method of determining operating characteristics for secondary system usage depends at least on the proximity of the transmitters and receivers of one or more primary incumbent systems, and the transmitters of one or more secondary devices.

21. The method of claim 1, wherein the secondary device is a broadcast-only device.

22. The method of claim 7, wherein the secondary device is a broadcast only device.

23. The method of claim 1, wherein the predicted available link budget is utilized to estimate a secondary device throughput for a given estimated path loss between the first location and the second location.

24. The method of claim 1, wherein the allowed transmission power level of the first secondary device is re-computed in response to a change in the first location, and the predicted aggregate interference level for the second secondary device is re-computed in response to a change in the second location.

* * * * *

UNITED STATES PATENT AND TRADEMARK OFFICE
CERTIFICATE OF CORRECTION

| | | |
|---|---|---|
| PATENT NO. | : 8,660,498 B2 | Page 1 of 1 |
| APPLICATION NO. | : 12/493886 | |
| DATED | : February 25, 2014 | |
| INVENTOR(S) | : Gurney et al. | |

It is certified that error appears in the above-identified patent and that said Letters Patent is hereby corrected as shown below:

On the title page, item 56

On Page 2, under "OTHER PUBLICATIONS", in Column 1, Line 17, delete ""Demon strati on" and insert -- "Demonstration --, therefor.

On Page 2, under "OTHER PUBLICATIONS", in Column 2, Lines 18-19, delete "Chang-Joo Kim et al—"WRAN PHYand MAC Proposal forTDD/FDD"" and insert -- Chang-Joo Kim et al.,—"WRAN PHY and MAC Proposal for TDD/FDD" --, therefor.

In the specification

In Column 8, Line 47, delete "pubic" and insert -- public --, therefor.

In Column 11, Lines 54-55, delete "received signal strength (RSSI)" and insert -- received signal strength indication (RSSI) --, therefor.

Signed and Sealed this
Third Day of May, 2016

Michelle K. Lee
*Director of the United States Patent and Trademark Office*